US011116123B2

(12) United States Patent
 Schoeny et al.

(10) Patent No.: US 11,116,123 B2
(45) Date of Patent: Sep. 14, 2021

(54) SYSTEM AND METHOD OF ADJUSTING CLOSING DISC PENETRATION DEPTH OF A SEED-PLANTING IMPLEMENT

(71) Applicant: CNH Industrial America LLC, New Holland, PA (US)

(72) Inventors: Christopher Schoeny, Yorkville, IL (US); Trevor Stanhope, Darien, IL (US)

(73) Assignee: CNH Industrial America LLC, New Holland, PA (US)

( * ) Notice: Subject to any disclaimer, the term of this patent is extended or adjusted under 35 U.S.C. 154(b) by 271 days.

(21) Appl. No.: 16/118,885

(22) Filed: Aug. 31, 2018

(65) Prior Publication Data
US 2020/0068778 A1 Mar. 5, 2020

(51) Int. Cl.
*A01B 63/24* (2006.01)
*A01C 5/06* (2006.01)
*A01B 79/02* (2006.01)

(52) U.S. Cl.
CPC .............. *A01B 63/24* (2013.01); *A01B 79/02* (2013.01); *A01C 5/066* (2013.01); *A01C 5/064* (2013.01)

(58) Field of Classification Search
CPC ....... A01B 63/24; A01B 63/32; A01B 63/008; A01B 79/02; A01C 5/066; A01C 5/064; A01C 7/205
See application file for complete search history.

(56) References Cited

U.S. PATENT DOCUMENTS

| | | | |
|---|---|---|---|
| 6,386,127 B1 | 5/2002 | Prairie et al. |
| 6,863,006 B2 | 3/2005 | Sandoval et al. |
| 7,861,660 B2 | 1/2011 | Martin |
| 8,550,020 B2 | 10/2013 | Sauder et al. |
| 8,634,992 B2 | 1/2014 | Sauder et al. |
| 8,763,713 B2 | 7/2014 | Bassett |
| 8,910,582 B2 | 12/2014 | Mariman et al. |
| 8,985,232 B2 | 3/2015 | Bassett |

(Continued)

OTHER PUBLICATIONS

Needham, Successful Opening, Closing the Seed Slot With No-Till Planters and Drills, Needham Ag Technologies, LLC, 17th Annual National No-Till Conference, Indianapolis, Indiana, Jan. 14-17, 2009, 8 Pages.

(Continued)

*Primary Examiner* — Jessica H Lutz
(74) *Attorney, Agent, or Firm* — Rebecca L. Henkel; Rickard K. DeMille

(57) ABSTRACT

In one aspect, a system for adjusting closing disc penetration depth of a seed-planting implement may include a furrow closing assembly having at least one closing disc configured to penetrate the soil in a manner that closes a furrow formed in the soil by the seed-planting implement. The system may also include an actuator configured to adjust a penetration depth of the at least one closing disc. Furthermore, the system may include a controller configured to receive an input indicative of at least one of an operation of the seed-planting implement or a field condition of a field across which the seed-planting implement is being moved. Additionally, the controller may be further configured to control an operation of the actuator in a manner that adjusts the penetration depth of the at least one closing disc based on the received input.

13 Claims, 5 Drawing Sheets

(56) References Cited

U.S. PATENT DOCUMENTS

| | | | |
|---|---|---|---|
| 9,215,837 | B2 | 12/2015 | Adams et al. |
| 9,232,687 | B2* | 1/2016 | Bassett .................. A01B 61/048 |
| 9,307,689 | B2 | 4/2016 | Adams et al. |
| 9,554,504 | B2 | 1/2017 | Houck |
| 9,585,301 | B1* | 3/2017 | Lund ..................... G01N 27/223 |
| 9,629,304 | B2 | 4/2017 | Zielke |
| 9,675,004 | B2 | 6/2017 | Landphair et al. |
| 9,750,174 | B2 | 9/2017 | Sauder et al. |
| 10,477,753 | B2* | 11/2019 | Achen .................. A01B 61/044 |
| 2013/0032363 | A1* | 2/2013 | Curry ..................... A01C 7/205 172/4 |
| 2014/0041563 | A1* | 2/2014 | Henry .................... A01C 5/062 111/139 |
| 2014/0116735 | A1* | 5/2014 | Bassett .................. A01B 63/008 172/2 |
| 2016/0165788 | A1* | 6/2016 | Anderson .............. A01C 7/205 111/193 |
| 2018/0317380 | A1* | 11/2018 | Bassett ................... A01C 7/205 |
| 2019/0045703 | A1* | 2/2019 | Bassett ................... A01B 63/32 |
| 2019/0297769 | A1* | 10/2019 | Zielke ..................... A01B 49/06 |

OTHER PUBLICATIONS

Yetter, Planter Adjustment Guide, Yetter Farm Equipment, Yetter Manufacturing Co, retrieved on Jul. 19, 2018, 9 pages. http://www.vetterco.com/customer-support/solutions-and-tips/planter-adjustment-guide.

John Deere, Planter Parts, Closing Systems, Deere & Company, 2017, 2 Pages.

Kinze Manufacturing, 8 Tips for Preparing a Planter for Fieldwork, Farm Industry News, Apr. 4, 2012, 4 pages. https://www.farmindustrynews.com/print/4937; https://www.farmindustrynews.com/planters/8-tips-preparing-planter-fieldwork.

* cited by examiner

SYSTEM AND METHOD OF ADJUSTING CLOSING DISC PENETRATION DEPTH OF A SEED-PLANTING IMPLEMENT

FIELD OF THE INVENTION

The present disclosure generally relates to seed-planting implements and, more particularly, to systems and methods of adjusting closing disc penetration depth of a seed-planting implement based on the operation of the implement and/or field conditions.

BACKGROUND OF THE INVENTION

Modern farming practices strive to increase yields of agricultural fields. In this respect, seed-planting implements are towed behind a tractor or other work vehicle to disperse seeds throughout a field. For example, seed-planting implements typically include one or more furrow forming tools or openers that excavate a furrow or trench in the soil. One or more dispensing devices of the seed-planting implements may, in turn, deposit the seeds into the furrow(s). After deposition of the seeds, a furrow closing assembly may close the furrow in the soil. For example, one or more closing discs of the furrow closing assembly may penetrate the soil in a manner that collapses the side walls of the furrow as the seed-planting implement is moved across the field. Given its intended function, the performance of the furrow closing assembly may, in many circumstances, be affected by the penetration depth of the closing disc(s).

Accordingly, an improved system and method of adjusting closing disc penetration depth of a seed-planting implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for adjusting closing disc penetration depth of a seed-planting implement. The system includes a furrow closing assembly having at least one closing disc configured to penetrate the soil in a manner that closes a furrow formed in the soil by the seed-planting implement. The system may also include an actuator configured to adjust a penetration depth of the at least one closing disc. Furthermore, the system may include a controller configured to receive an input indicative of at least one of an operation of the seed-planting implement or a field condition of a field across which the seed-planting implement is being moved. Additionally, the controller may be further configured to control an operation of the actuator in a manner that adjusts the penetration depth of the at least one closing disc based on the received input.

In another aspect, the present subject matter is directed to a seed-planting implement. The seed-planting implement may include a frame and a furrow opening assembly adjustably coupled to the frame. The furrow opening assembly may include at least one disc opener configured to form a furrow in the soil. The seed-planting implement may also include a furrow closing assembly adjustably coupled to the frame. The furrow closing assembly may include at least one closing disc configured to penetrate the soil in a manner that closes the furrow. Furthermore, the seed-planting implement may include an actuator configured to adjust a position of the at least one closing disc relative to the frame. Additionally, the seed-planting implement may include a controller configured to monitor a depth of the furrow based on a received input indicative of at least one of an operation of the seed-planting implement or a field condition of a field across which the seed-planting implement is being moved. Moreover, the controller may be further configured to control an operation of the actuator in a manner that adjusts a penetration depth of the at least one closing disc based on the received input.

In a further aspect, the present subject matter is directed to a method for adjusting closing disc penetration depth of a seed-planting implement. The method including controlling, with a computing device, an operation of the seed-planting implement as the seed-planting implement is moved across a field. The seed-planting implement may include a furrow closing assembly having at least one closing disc configured to penetrate the soil in a manner that closes a furrow formed in the soil by the seed-planting implement. The method may also include receiving, with the computing device, an input indicative of at least one of an operation of the seed-planting implement or a field condition of the field across which the seed-planting implement is being moved. Furthermore, the system may include controlling, with the computing device, an operation of an actuator in a manner that adjusts a penetration depth of the at least one closing disc based on the received input.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
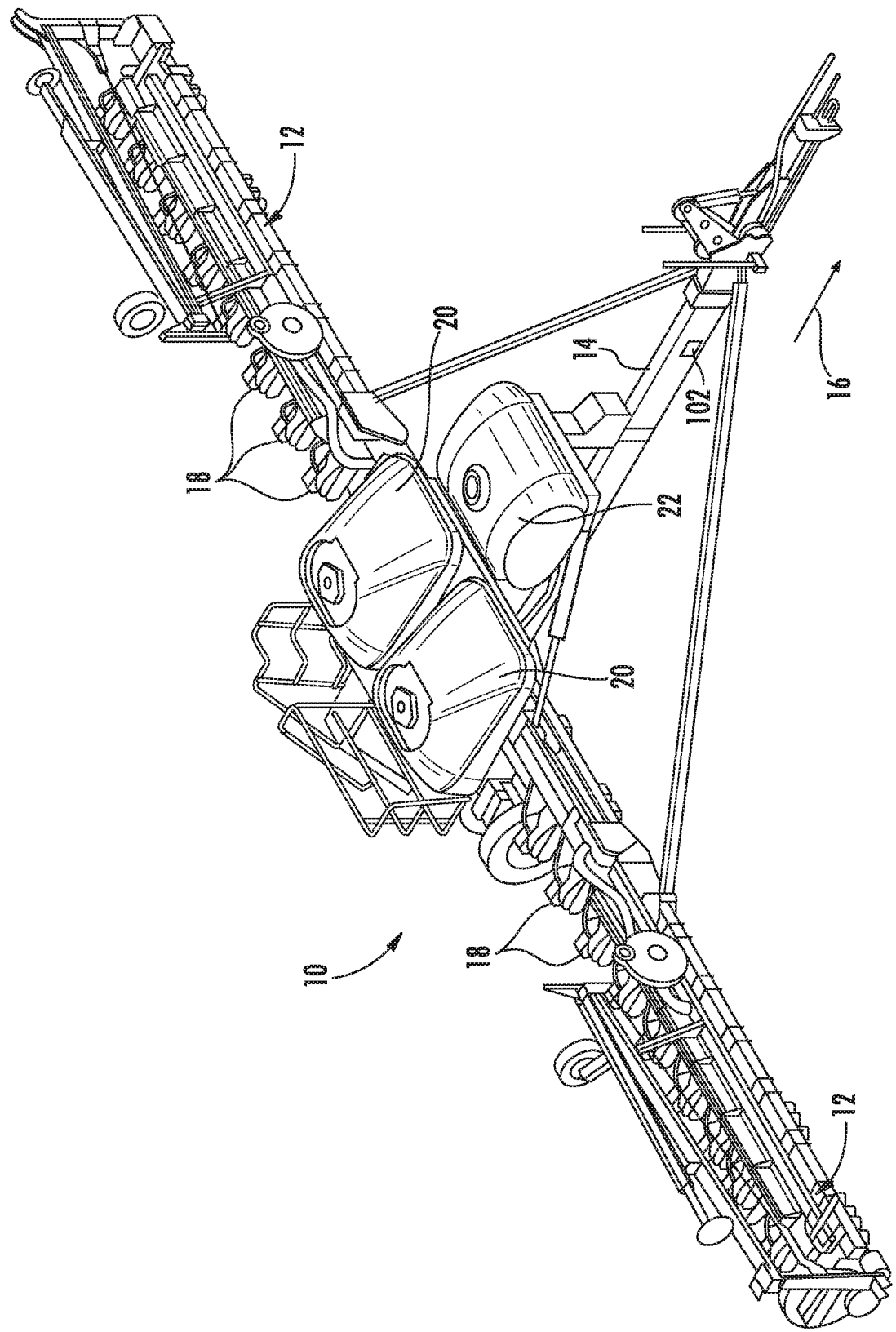
FIG. 1 illustrates a perspective view of one embodiment of a seed-planting implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for adjusting closing disc penetration depth of a seed-planting implement. Specifically, in several embodiments, a controller of the disclosed system may be configured to receive an input indicative of the operation of the seed-planting implement and/or a field condition of a field across which the seed-planting implement is being moved. For example, in one embodiment, the received input may be indicative of the depth of a furrow formed being formed by the seed-planting implement, such as measurement signals received from a sensor configured to detect a parameter associated with the position of a gauge wheel of the implement relative to a frame of the implement. Thereafter, the controller may be configured to control the operation of an actuator of the seed-planting implement in a manner that adjusts the penetration depth of a closing disc(s) of the implement based on the received input.

Referring now to the drawings, FIG. 1 illustrates a perspective view of one embodiment of a seed-planting implement 10 in accordance with aspects of the present subject matter. It should be appreciated that, although the seed-planting implement 10 illustrated herein corresponds to a planter, the seed-planting implement 10 may generally correspond to any suitable equipment or implement, such as seeder (e.g., a seed disc drill) or another seed dispensing implement, a side dresser or another fertilizer dispensing implement, a strip tiller, and/or the like.

As shown in FIG. 1, the implement 10 may include a laterally extending toolbar or frame assembly 12 connected at its middle to a forwardly extending tow bar 14 to allow the implement 10 to be towed by a work vehicle (not shown), such as an agricultural tractor, in a direction of travel (e.g., as indicated by arrow 16 in FIG. 1). The toolbar 12 may generally be configured to support a plurality of seed planting units (or row units) 18. As is generally understood, each row unit 18 may be configured to deposit seeds at a desired depth beneath the soil surface and at a desired seed spacing as the implement 10 is being towed by the work vehicle, thereby establishing rows of planted seeds. In some embodiments, the bulk of the seeds to be planted may be stored in one or more hoppers or seed tanks 20. Thus, as seeds are planted by the row units 18, a pneumatic distribution system may distribute additional seeds from the seed tanks 20 to the individual row units 18. Additionally, one or more fluid tanks 22 may store agricultural fluids, such as insecticides, herbicides, fungicides, fertilizers, and/or the like.

It should be appreciated that, for purposes of illustration, only a portion of the row units 18 of the implement 10 have been shown in FIG. 1. In general, the implement 10 may include any number of row units 18, such as six, eight, twelve, sixteen, twenty-four, thirty-two, or thirty-six row units. In addition, it should be appreciated that the lateral spacing between row units 18 may be selected based on the type of crop being planted. For example, the row units 18 may be spaced approximately thirty inches from one another for planting corn, and approximately fifteen inches from one another for planting soybeans.

Furthermore, a soil moisture sensor 102 may be provided operative association with the implement 10. As such, the soil moisture sensor 102 may be configured to detect a parameter associated with the moisture content of the soil within the field across which the implement 10 is being moved. For example, in one embodiment, the soil moisture sensor 102 may be configured as an optical sensor configured to detect one or more characteristics of light reflected by the soil, with such characteristics generally being indicative of the soil moisture content. However, it should be appreciated that, in alternative embodiments, the soil moisture sensor 102 may be configured as any other suitable device for sensing or detecting the moisture content of the soil.

It should also be appreciated that the configuration of the seed-planting implement 10 described above and shown in FIG. 1 is provided only to place the present subject matter in an exemplary field of use. Thus, it should be appreciated that the present subject matter may be readily adaptable to any manner of implement configuration.

Figure 2:
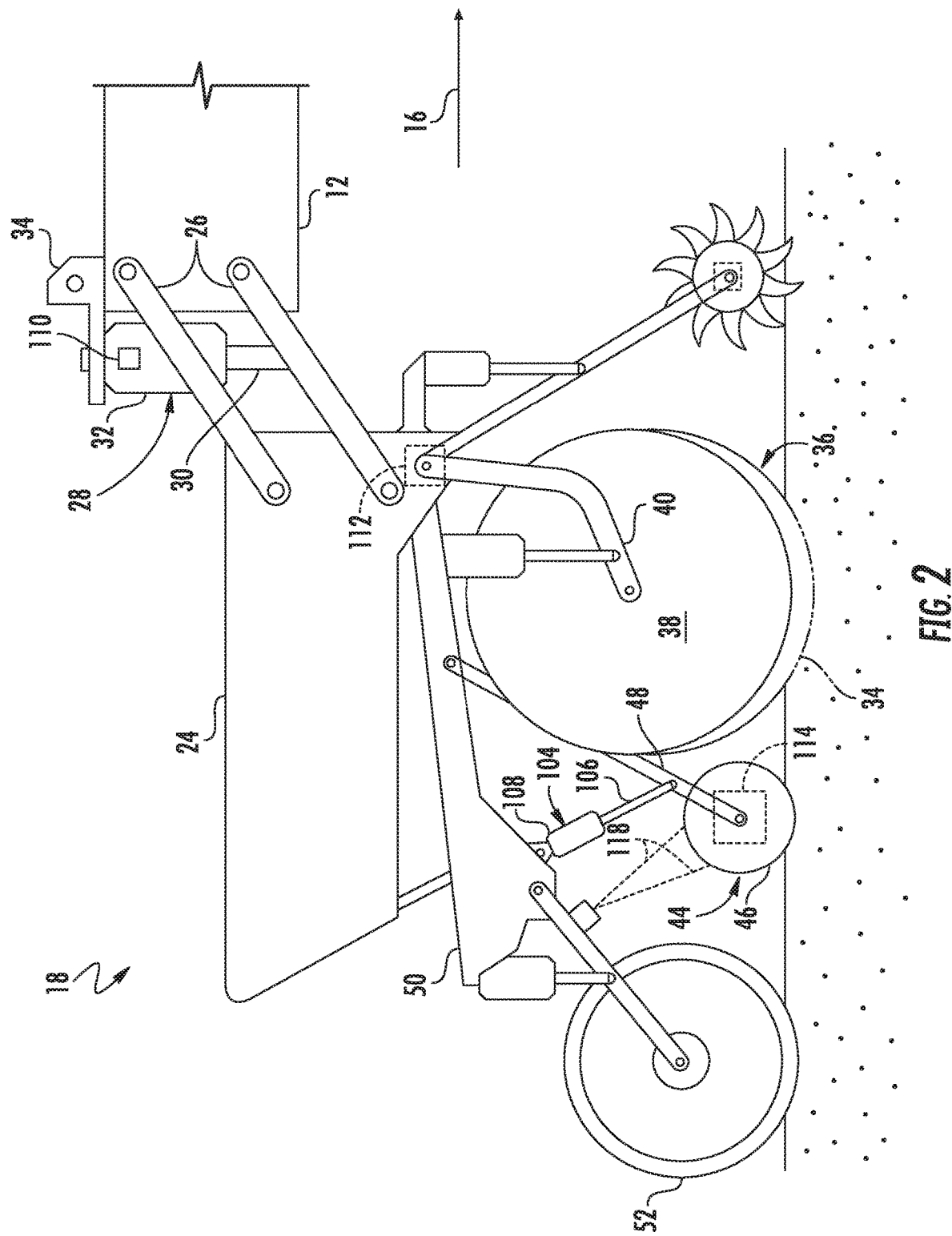
FIG. 2 illustrates a side view of one embodiment of a row unit suitable for use with a seed-planting implement in accordance with aspects of the present subject matter.

Referring now to FIG. 2, a side view of one embodiment of a row unit 18 is illustrated in accordance with aspects of the present subject matter. As shown, the row unit 18 may include a frame 24 adjustably coupled to the toolbar 12 by links 26. For example, one end of each link 26 may be pivotably coupled to the frame 24, while an opposed end of each link 26 may be pivotably coupled to the toolbar 12. In one embodiment, the links 26 may be parallel. However, it should be appreciated that, in alternative embodiments, the row unit 18 may be coupled to the toolbar 12 in any other suitable manner. For example, the links 26 may be fixedly coupled to the frame 24 and/or the links 26 may be non-parallel. Additionally, in a further embodiment, the implement 10 may not include the links 26. In such instance, the implement 10 may include other components for coupling each row unit 18 to the toolbar 12.

As shown in FIG. 2, in one embodiment, a row unit actuator 28 may be configured to move or otherwise adjust the position of the row unit 18 relative to the toolbar 12. For example, as shown in the illustrated embodiment, a first end of the actuator 28 (e.g., a rod 30 of the actuator 28) may be coupled to one of the links 26, while a second end of the actuator 28 (e.g., the cylinder 32 of the actuator 28) may be coupled to a bracket 34, which is, in turn, coupled to the toolbar 12. The rod 30 of the actuator 28 may be configured to extend and/or retract relative to the cylinder 32 to adjust the downforce being applied to the row unit 18. In addition, such extension and/or retraction may move the row unit 18 between an operating position relative to the ground in which one or more components of the row unit 18 engage the soil and a raised position relative to the ground in which the component(s) is lifted out of the soil. In the illustrated embodiment, the actuator 28 corresponds to a fluid-driven actuator, such as hydraulic or pneumatic cylinder. However, it should be appreciated that the actuator 28 may correspond to any other suitable type of actuator, such as an electric linear actuator.

In several embodiments, the row unit 18 also includes a furrow opening assembly 36. For example, in one embodiment, the furrow opening assembly 36 may include a gauge wheel 38 operatively coupled to the frame 24 of the row unit 18 via a support arm 40. Furthermore, the furrow opening assembly 36 may also include one or more opener discs 42 configured to excavate a furrow or trench in the soil. As is generally understood, the gauge wheel 38 may be configured to engage the top surface of the soil as the implement 10 is moved across the field. In this regard, the position of the opener disc(s) 42 may be adjusted with respect to the position of the gauge wheel 38 to set the desired depth of the furrow being excavated.

Moreover, as shown, the row unit 18 may include a furrow closing assembly 44. Specifically, in several embodiments, the furrow closing assembly 44 may include a pair of closing discs 46 (only one of which is shown) positioned relative to each other in a manner that permits soil to flow between the discs 46 as the implement 10 is being moved across the field. As such, the closing discs 46 may be configured to close the furrow after seeds have been deposited therein. For example, as the implement 10 is moved across the field, the closing discs 46 may be configured to penetrate the soil in a manner that collapses the side walls of the furrow. Furthermore, the furrow closing assembly 44 may include a support arm 48 configured to adjustably couple the closing discs 46 to the frame assembly 24. For example, one end of the support arm 48 may be pivotably coupled to the closing discs 46, while an opposed end of the support arm 48 may be pivotably coupled to the frame 24. However, it should be appreciated that, in alternative embodiments, the closing discs 46 may be coupled to the frame 24 in any other suitable manner. Furthermore, it should be appreciated that, in alternative embodiments, the furrow closing assembly 44 may include any other suitable number of closing discs 46, such as one closing disc 46 or three or more closing discs 46. Additionally, the row unit 18 may include a press wheel 52 configured to roll over the closed furrow to firm the soil over the seed and promote favorable seed-to-soil contact.

In accordance with aspects of the present subject matter, a furrow closing assembly actuator 104 may be configured to move or otherwise adjust the position of the furrow closing assembly 44 relative to the frame 24. For example, as shown in the illustrated embodiment, a first end of the actuator 104 (e.g., a rod 106 of the actuator 104) may be coupled to the support arm 48 of the furrow closing assembly 44, while a second end of the actuator 104 (e.g., the cylinder 108 of the actuator 104) may be coupled to a chassis arm 50, which is, in turn, coupled to the frame 24. The rod 106 of the actuator 104 may be configured to extend and/or retract relative to the cylinder 108 to adjust the penetration depth of the closing disc(s) 46. In addition, such extension and/or retraction may move the furrow closing assembly 44 between an operating position relative to the ground in which the closing disc(s) 46 penetrates the soil and a raised position relative to the ground in which the closing disc(s) 46 is lifted out of the soil. In the illustrated embodiment, the actuator 104 corresponds to a fluid-driven actuator, such as hydraulic or pneumatic cylinder. However, it should be appreciated that the actuator 104 may correspond to any other suitable type of actuator, such as an electric linear actuator.

Moreover, a down force sensor 110 may be provided in operative association with the row unit 18. As such, the down force sensor 110 may be configured to detect a parameter associated with the down force being applied to the row unit 18, such as by the row unit actuator 28. For example, in one embodiment, the down force sensor 110 may be configured as a pressure sensor configured to detect the fluid pressure within the cylinder 32 of the actuator 28. The fluid pressure may, in turn, be indicative of the down force being applied to the row unit 18. However, it should be appreciated that, in alternative embodiments, the down force sensor 110 may be configured as any other suitable device for sensing or detecting the down force being applied to the row unit 18.

Furthermore, in several embodiments, a depth sensor 112 may be provided in operative association with the furrow opening assembly 36 of the row unit 18. As such, the depth sensor 112 may be configured to detect a parameter associated with the depth to which the disc opener(s) 42 penetrates the soil. For example, in one embodiment, the depth sensor 112 may be configured as a potentiometer configured to detect the angle defined between the support arm 40 on which the gauge wheel 38 is mounted and the frame 24 to which the arm 40 is coupled. The angle between the support arm 40 and the frame 24 may, in turn, be indicative of the penetration depth of the disc opener(s) 42. However, it should be appreciated that, in alternative embodiments, the depth sensor 112 may be configured as any other suitable device for sensing or detecting the penetration depth of the disc opener(s) 42.

In one embodiment, a load sensor 114 may be provided in operative association with the furrow closing assembly 44 of the row unit 18. As such, the load sensor 114 may be configured to detect a parameter associated with the load exerted on the furrow closing assembly 44 as the implement 10 is moved across the field. For example, in one embodiment, the load sensor 114 may be configured as a load pin positioned between the closing disc(s) 46 and the support arm 48. However, it should be appreciated that, in alternative embodiments, the load sensor 114 may be configured as any other suitable device for sensing or detecting the load exerted on the furrow closing assembly 44, such as a strain gauge mounted on the support arm 48.

Additionally, a soil flow sensor 116 may be provided in operative association with the row unit 18. Specifically, in several embodiments, the soil flow sensor 116 may be configured to capture data indicative of the flow of soil through the furrow closing assembly 44. In general, the flow of soil through the furrow closing assembly 44 may be indicative of the performance of the furrow closing assembly 44. For example, in certain instances, the soil may not be properly flowing through the furrow closing assembly 44 when the penetration depth of the closing disc(s) 46 is too shallow and/or too deep. In one embodiment, the soil flow sensor 116 may be a vision-based or Radio Detection and Ranging (RADAR) based sensor mounted or installed on the row unit 18 such that the soil flow sensor 116 has a field of view or sensor detection range (e.g., as indicated by dashed lines 118 in FIG. 2) directed towards the closing discs 46 of the furrow closing assembly 44. As such, the soil flow sensor 116 may be configured to capture soil flow data (e.g., vision-based or RADAR-based data) of the soil flowing through the furrow closing assembly 44 as the implement 10 is moved across the field.

It should be appreciated that the soil flow sensor 116 may correspond to any suitable sensing device(s) configured to detect or capture vision-based data (e.g., images, point cloud data, and/or the like) or RADAR-based data associated with the soil flow within an associated field of view. For example, in several embodiments, the soil flow sensor 116 may correspond to Light Detection and Ranging (LIDAR) sensors or RADAR sensors. However, in alternative embodiments, the soil flow sensor 116 may correspond to any other suitable vision-based or beam-based sensing device(s), such as optical beam sensors and/or cameras.

It should be appreciated that the configuration of the row unit 18 described above and shown in FIG. 2 is provided only to place the present subject matter in an exemplary field of use. Thus, it should be appreciated that the present subject matter may be readily adaptable to any manner of row unit configuration.

Figure 3:
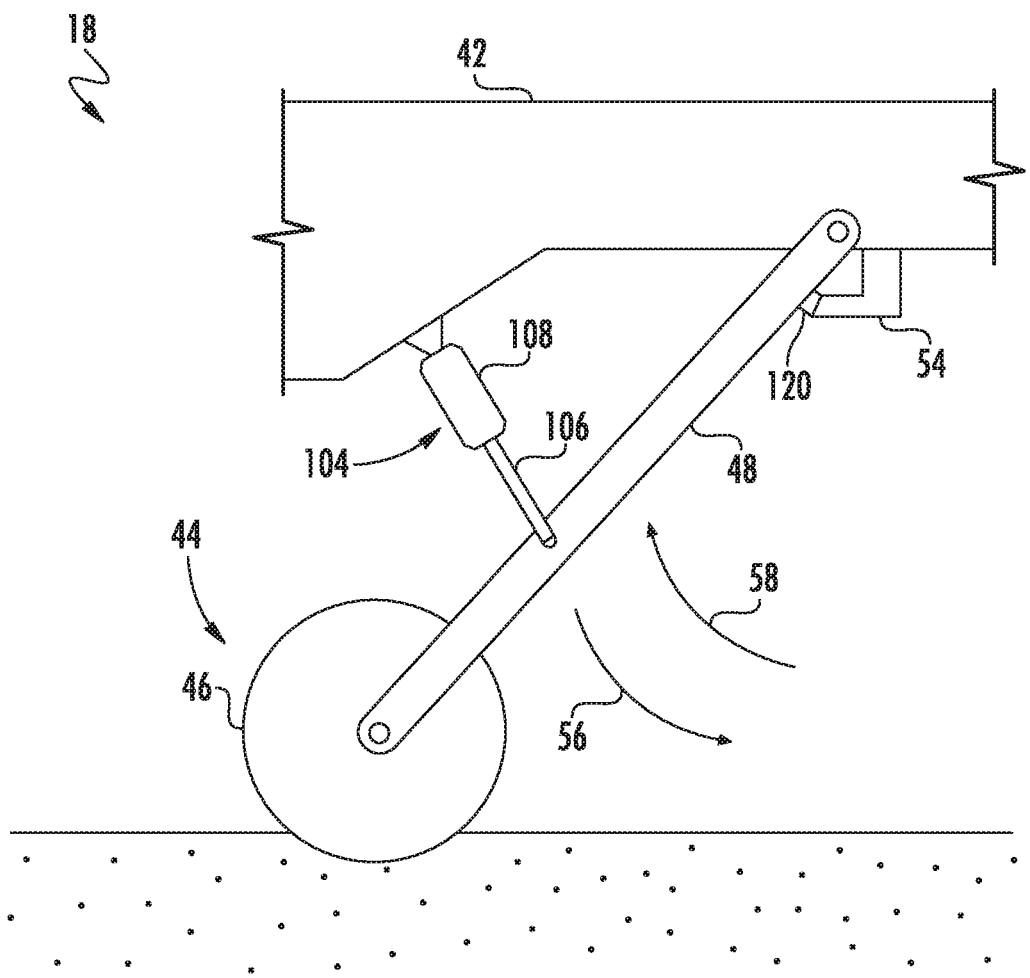
FIG. 3 illustrates a partial side view of another embodiment of a row unit suitable for use with a seed-planting implement in accordance with aspects of the present subject matter, particularly illustrating a position sensor positioned between a support arm of row unit and a mechanical stop of the row unit.

Referring now to FIG. 3, an enlarged side view of another embodiment of the row unit 18 described above with reference to FIG. 2 is illustrated in accordance with aspects of the present subject matter. As shown, the row unit 18 may generally be configured the same as or similar to that described above with reference to FIG. 2. For instance, the row unit 18 may include a furrow closing assembly 44 having a pair of closing discs 46 (only one of which is shown) and a support arm 48 configured to adjustably couple the closing discs 46 to a frame assembly 24. In this regard, one end of the support arm 48 may be pivotably coupled to the closing discs 46, while an opposed end of the support arm 48 may be pivotably coupled to the frame 24. However, as shown in FIG. 3, unlike the above-described embodiment, the row unit 18 may include a mechanical stop 54 coupled to the chassis arm 50 and configured to set the maximum penetration depth of the closing discs 46. For example, the support arm 48 may be configured to pivot in a first direction (e.g., as indicated by arrow 56 in FIG. 3) until the arm 48 contacts the mechanical stop 54, such as when the rod 106 of the actuator 104 extends relative to the cylinder 108. As such, when the support arm 48 is in contact with the mechanical stop 54, the closing discs 46 may be positioned in a manner that provides the maximum penetration depth. Furthermore, the support arm 48 may also be configured to pivot in a second direction (e.g., as indicated by arrow 58 in FIG. 3) opposite of the first direction 56 away from the mechanical stop 54, such as when the rod 106 of the actuator 104 retracts relative to the cylinder 108.

Furthermore, as shown in FIG. 3, a position sensor 120 may be provided in operative association with the furrow closing assembly 44 of the row unit 18. As such, the position sensor 120 may be configured to detect the position of the support arm 48 relative to the mechanical stop 54. Specifically, in one embodiment, the position sensor 120 may be configured to detect contact between the support arm 48 and the mechanical stop 54, such as when the penetration depth of the closing discs 46 is at its maximum. Conversely, when the position sensor 120 does not detect contact between the support arm 48 and the mechanical stop 54, the penetration depth of the closing discs 46 may be less than its maximum penetration depth. For example, in one embodiment, an electric circuit within the position sensor 120 may be completed when the support arm 48 contacts the mechanical stop 54. In another embodiment, the position sensor 120 may additionally be configured to detect a distance or angle defined between the support arm 48 and the mechanical stop 54. However, it should be appreciated that, in alternative embodiments, the position sensor 120 may be configured as any other suitable device for sensing or detecting the position of the support arm 48 relative to the mechanical stop 54. Furthermore, although one position sensor 120 is shown in FIG. 3, it should be appreciated that that the implement 10 may include any other suitable number of position sensors 120, such as two or more position sensors 120.

Figure 4:
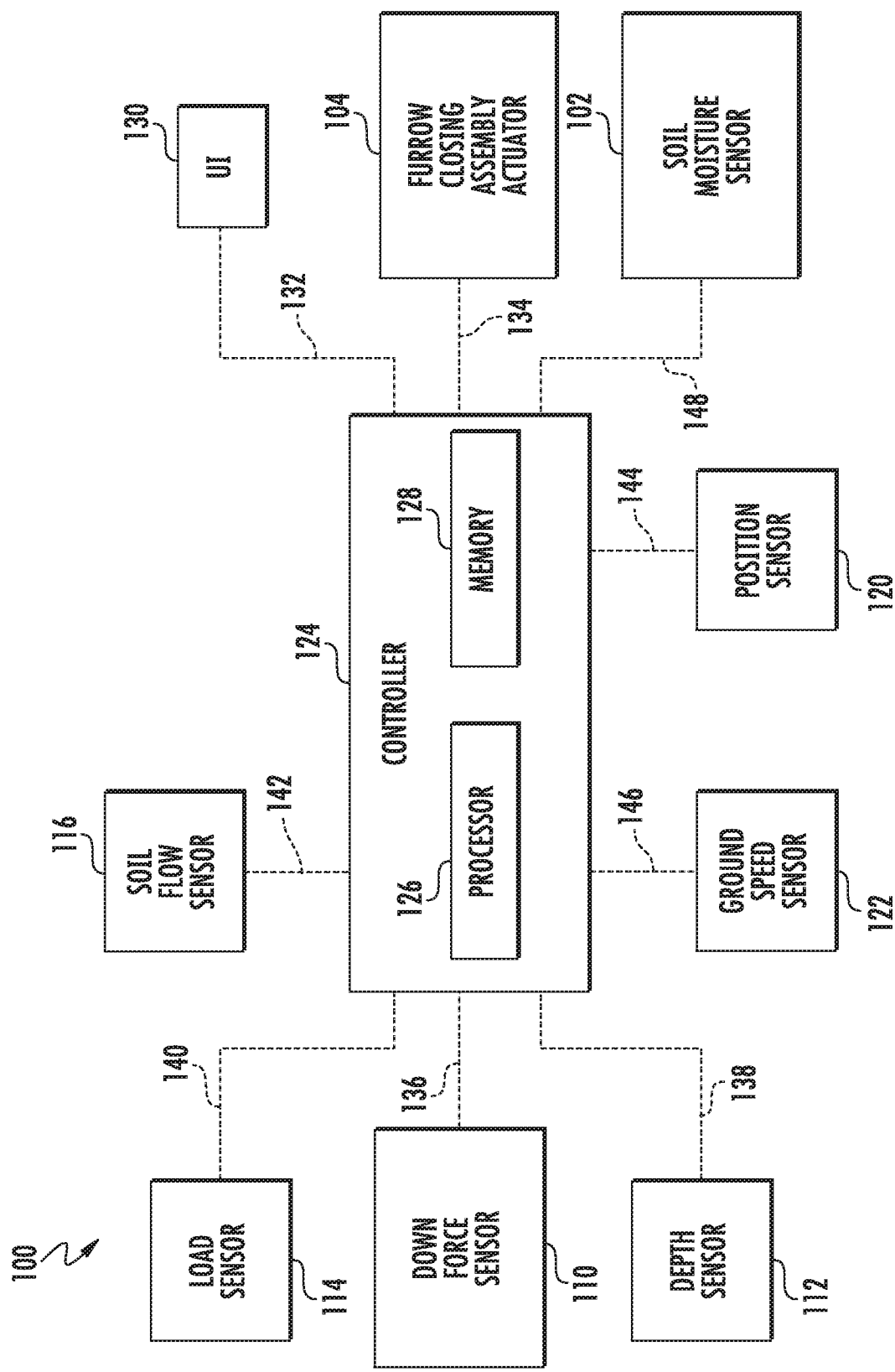
FIG. 4 illustrates a schematic view of one embodiment of a system for adjusting closing disc penetration depth of a seed-planting implement in accordance with aspects of the present subject matter.

Referring now to FIG. 4, a perspective view of one embodiment of a system 100 for adjusting closing disc penetration depth of a seed-planting implement is illustrated in accordance with aspects of the present subject matter. In general, the system 100 will be described herein with reference to the implement 10 and row unit 18 described above with reference to FIGS. 1-3. However, it should be appreciated by those of ordinary skill in the art that the disclosed system 100 may generally be utilized with seed-planting implements having any other suitable implement configuration and/or row units having any other suitable row unit configuration.

As shown in FIG. 4, the system 100 may include one or more components of the seed-planting implement 10 and/or the row unit 18. For example, in several embodiments, the system 100 may include one or more sensors configured to capture data indicative of the operation of the implement 10, such as the down force sensor 110, the depth sensor 112, the load sensor 114, the soil flow sensor 116, and/or the position sensor 120. Additionally, in one embodiment, the system 100 may also include one or more sensors configured to capture data indicative of one or more field conditions of the field across which the implement 10 is being moved, such as the soil moisture sensor 102. However, it should be appreciated that, in alternative embodiments, the system 100 may include any other suitable components of the implement 10 and/or row unit 18.

Additionally, as shown in FIG. 4, the system 100 may include a ground speed sensor 122 configured to detect a parameter associated with the ground speed at which the implement 10 is being moved across the field. As such, the ground speed sensor 122 may be provided in operative association with the implement 10 or an associated work vehicle (not shown). For example, in one embodiment, the ground speed sensor 122 may be configured as a Hall Effect sensor configured to detect the rotational speed of an output shaft of a transmission of the work vehicle. However, it should be appreciated that, in alternative embodiments, the ground speed sensor 122 may be configured as any other suitable device for sensing or detecting the ground speed of the implement 10.

In accordance with aspects of the present subject, the system 100 may include a controller 124 configured to electronically control the operation of one or more components of the implement 10. In general, the controller 124 may comprise any suitable processor-based device known in the art, such as a computing device or any suitable combination of computing devices. Thus, in several embodiments, the controller 124 may include one or more processor(s) 126 and associated memory device(s) 128 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 128 of the controller 124 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 128 may generally be configured to store suitable computer-readable instructions that, when implemented by the processor(s) 126, configure the controller 124 to perform various computer-implemented functions, such as one or more aspects of the method 200 described below with reference to FIG. 5. In addition, the controller 124 may also include various other suitable components, such as a communications circuit or module, one or more input/output channels, a data/control bus and/or the like.

It should be appreciated that the controller 124 may correspond to an existing controller of the implement 10 or an associated work vehicle (not shown) or the controller 124 may correspond to a separate processing device. For instance, in one embodiment, the controller 124 may form all or part of a separate plug-in module that may be installed within the implement 10 or associated work vehicle to allow for the disclosed system and method to be implemented without requiring additional software to be uploaded onto existing control devices of the implement 10 or the associated work vehicle.

Furthermore, in one embodiment, the system 100 may also include a user interface 130. More specifically, the user interface 130 may be configured to receive input (e.g., input associated with the depth of the disc opener(s) 42) from the operator of the implement 10. As such, the user interface 130 may include one or more input devices (not shown), such as touchscreens, keypads, touchpads, knobs, buttons, sliders, switches, mice, microphones, and/or the like, which are configured to receive such inputs. In addition, some embodiments of the user interface 130 may include one or more feedback devices (not shown), such as display screens, speakers, warning lights, and/or the like, which are configured to communicate feedback to the operator. In one embodiment, the user interface 130 may be positioned within a cab of a work vehicle configured to tow the implement 10 across the field. However, in alternative embodiments, the user interface 130 may have any suitable configuration and/or be positioned in any other suitable location.

In several embodiments, the controller 124 may be configured to receive an input indicative of the operation of the implement 10 or a field condition of the field across which the implement 10 is being moved. More specifically, the controller 124 may be communicatively coupled to one or more sensors configured to capture data indicative of the operation of the implement 10 via wired or wireless connection to allow implement operation data to be transmitted from the sensors to the controller 124. As such, the controller 124 may be configured to determine or estimate one or more operational parameters associated with the operation of the implement 10 based on the received implement operation data. Additionally, the controller 124 may be communicatively coupled to one or more sensors configured to capture data indicative of one or more field conditions of the field via wired or wireless connection to allow field data to be transmitted from the sensors to the controller 124. As such, the controller 124 may be configured to determine or estimate one or more field parameters associated with the condition(s) of the field based on the received field data. For instance, the controller 124 may include a look-up table, suitable mathematical formula, and/or algorithms stored within its memory 128 that correlates the received implement operation data to the associated operational parameter(s) and/or the received field data to the associated field parameter(s).

In one embodiment, the controller 124 may be configured to receive the input indicative of the operation of the implement 10 or the field condition from the operator of the implement 10. More specifically, the controller 124 may be communicatively coupled to the user interface 130 via a wired or wireless connection to allow user input signals (e.g., indicated by dashed line 132 in FIG. 4) to be transmitted from the user interface 130 to the controller 124. In this regard, the operator of the implement 10 may provide the input to the user interface 130, such as via one or more input devices. The input may, in turn, be transmitted to the controller 124 via user input signals 132.

In accordance with aspects of the present subject matter, the controller 124 may be configured to control the operation of the furrow closing assembly 44 in a manner that adjusts the penetration depth of the closing discs 46 based on the received input. Specifically, as shown in FIG. 4, the controller 124 may be communicatively coupled to one or more components of the furrow closing assembly 44, such as the actuator 104, via a wired or wireless connection to allow control signals (e.g., indicated by dashed lines 134 in FIG. 4) to be transmitted from the controller 124 to the actuator 104. In this regard, the controller 124 may be configured to transmit control signals 134 to the actuator 104 instructing the actuator 104 to adjust the penetration depth of the closing disc(s) 46, such as by extending or retracting the actuator's rod 106 relative to the corresponding cylinder 108, based on the received input. For example, in one embodiment, the controller 124 may be configured to compare the determined operational and/or field parameters to one or more associated threshold parameter values. Thereafter, in the event that the values of the determined operational and/or field parameters exceeds or falls below the threshold parameter value(s) (thereby indicating that the values of the parameter(s) may be too high or too low), the controller 124 may be configured to transmit control signals 134 to the actuator 104 instructing the actuator 104 to adjust the penetration depth of the closing disc(s) 46.

In one embodiment, the received input may be indicative of the down force being applied to the row unit 18. In such embodiment, the controller 124 may be communicatively coupled to the down force sensor 110 via wired or wireless connection to allow measurement signals (e.g., as indicated by dashed lines 136 in FIG. 4) to be transmitted from the down force sensor 110 to the controller 124. As such, the controller 124 may be configured to determine or estimate the down force being applied to the row unit 18, such as by the row unit actuator 28, based on the received measurement signals 136. For instance, the controller 124 may include a look-up table, suitable mathematical formula, and/or algorithms stored within its memory 128 that correlates the received measurement signals 136 to the applied down force. Thereafter, the controller 124 may be configured to transmit control signals 134 to the actuator 104 instructing the actuator 104 to decrease the penetration depth of the closing discs 46 when the determined down force decreases. Conversely, the controller 124 may be configured to transmit control signals 134 to the actuator 104 instructing the actuator 104 to increase the penetration depth of the closing discs 46 when the determined down force increases.

In another embodiment, the received input may be indicative of the depth of the furrow being formed by the disc opener(s) 42. In such embodiment, the controller 124 may be communicatively coupled to the depth sensor 112 via wired or wireless connection to allow measurement signals (e.g., as indicated by dashed lines 138 in FIG. 4) to be transmitted from the depth sensor 112 to the controller 124. As such, the controller 124 may be configured to determine or estimate the depth of the furrow based on the received measurement signals 138. For instance, the controller 124 may include a look-up table, suitable mathematical formula, and/or algorithms stored within its memory 128 that correlates the received measurement signals 138 to the furrow depth. Thereafter, the controller 124 may be configured to transmit control signals 134 to the actuator 104 instructing the actuator 104 to increase the penetration depth of the closing discs 46 when the determined furrow depth increases. Conversely, the controller 124 may be configured to transmit control signals 134 to the actuator 104 instructing the actuator 104 to decrease the penetration depth of the closing discs 46 when the determined furrow depth decreases.

In a further embodiment, the received input may be indicative of the load exerted on the furrow closing assembly 44 as the implement 10 is moved across the field. In such embodiment, the controller 124 may be communicatively coupled to the load sensor 114 via wired or wireless connection to allow measurement signals (e.g., as indicated by dashed lines 140 in FIG. 4) to be transmitted from the load sensor 114 to the controller 124. As such, the controller 124 may be configured to determine or estimate the load exerted on the furrow closing assembly 44 based on the received measurement signals 140. For instance, the controller 124 may include a look-up table, suitable mathematical formula, and/or algorithms stored within its memory 128 that correlates the received measurement signals 140 to the load exerted on the furrow closing assembly 44. Thereafter, the controller 124 may be configured to transmit control signals 134 to the actuator 104 instructing the actuator 104 to decrease the penetration depth of the closing discs 46 when the determined load increases. Conversely, the controller 124 may be configured to transmit control signals 134 to the actuator 104 instructing the actuator 104 to increase the penetration depth of the closing discs 46 when the determined load decreases.

In yet another embodiment, the received input may be indicative of data associated with soil flow through the furrow closing assembly 44. In such embodiment, the controller 124 may be communicatively coupled to the soil flow sensor 116 via wired or wireless connection to allow soil flow data (e.g., as indicated by dashed lines 142 in FIG. 4) to be transmitted from the soil flow sensor 116 to the controller 124. As such, the controller 124 may be configured to process or analyze the received soil flow data 142 to determine when the soil is not properly flowing through the furrow closing assembly 44, such as when the closing discs 46 are not rotating freely relative the soil. For example, the controller 124 may include any suitable data processing algorithms stored within its memory 128 or may otherwise use any suitable data processing techniques to monitor the soil flow through the furrow closing assembly 44 based on the soil flow data 142. Thereafter, the controller 124 may be configured to transmit control signals 134 to the actuator 104 instructing the actuator 104 to increase and/or decrease penetration depth of the closing discs 46 based on the monitored soil flow.

Furthermore, in another embodiment, the received input may be indicative of the position of the support arm 48 of the furrow closing assembly 44 relative to the mechanical stop 54. In such embodiment, the controller 124 may be communicatively coupled to the position sensor 120 via wired or wireless connection to allow position signals (e.g., as indicated by dashed lines 144 in FIG. 4) to be transmitted from the position sensor 120 to the controller 124. As such, the controller 124 may be configured to monitor the position of the support arm 48 relative to the mechanical stop 54 based on the received position signals 144. As indicated above, the position signals 144 may be indicative of contact (or a lack thereof) between the support arm 48 and the mechanical stop 54, the angle between the support arm 48 and the mechanical stop 54, the distance the support arm 48 and the mechanical stop 54, and/or the like. For instance, the controller 124 may include a look-up table, suitable mathematical formula, and/or algorithms stored within its memory 128 that correlates the received position signals 144 to the position of the support arm 48 relative to the mechanical stop 54. Thereafter, the controller 124 may be configured to transmit control signals 134 to the actuator 104 instructing the actuator 104 to increase or decrease the penetration depth of the closing discs 46 based on the monitored position of the support arm 48. For instance, in one embodiment, the control signals 134 may instruct the actuator 104 to increase the penetration depth of the closing discs 46 when the monitored angle or distance between the support arm 48 and the mechanical stop 54 increases. Conversely, the control signals 134 may instruct the actuator 104 to decrease the penetration depth of the closing discs 46 when the monitored angle or distance between the support arm 48 and the mechanical stop 54 decreases. In another embodiment, the control signals 134 may instruct the actuator 104 to increase the penetration depth of the closing discs 46 when it is determined that the support arm 48 is not in contact with the mechanical stop 54.

Moreover, in one embodiment, the received input may be indicative of the ground speed of the implement 10. In such embodiment, the controller 124 may be communicatively coupled to the speed sensor 122 via wired or wireless connection to allow measurement signals (e.g., as indicated by dashed lines 146 in FIG. 4) to be transmitted from the ground speed sensor 122 to the controller 124. As such, the controller 124 may be configured to determine or estimate the ground speed of the implement 10 based on the received measurement signals 146. For instance, the controller 124 may include a look-up table, suitable mathematical formula, and/or algorithms stored within its memory 128 that correlates the received measurement signals 146 to the ground speed of the implement 10. Thereafter, the controller 124 may be configured to transmit control signals 134 to the actuator 104 instructing the actuator 104 to decrease the penetration depth of the closing discs 46 when the determined travel speed decreases. Conversely, the controller 124 may be configured to transmit control signals 134 to the actuator 104 instructing the actuator 104 to increase the penetration depth of the closing discs 46 when the determined travel speed increases.

Additionally, in one embodiment, the received input may be indicative of the moisture content of the soil within the field across which the implement 10 is being moved. In such embodiment, the controller 124 may be communicatively coupled to the soil moisture sensor 102 via wired or wireless connection to allow measurement signals (e.g., as indicated by dashed lines 148 in FIG. 4) to be transmitted from the soil moisture sensor 102 to the controller 124. As such, the controller 124 may be configured to determine or estimate the moisture content of the soil within the field based on the received measurement signals 148. For instance, the controller 124 may include a look-up table, suitable mathematical formula, and/or algorithms stored within its memory 128 that correlates the received measurement signals 148 to the moisture content of the soil. Thereafter, the controller 124 may be configured to transmit control signals 134 to the actuator 104 instructing the actuator 104 to decrease the penetration depth of the closing discs 46 when the determined soil moisture increases. Conversely, the controller 124 may be configured to transmit control signals 134 to the actuator 104 instructing the actuator 104 to increase the penetration depth of the closing discs 46 when the determined soil moisture decreases.

Figure 5:
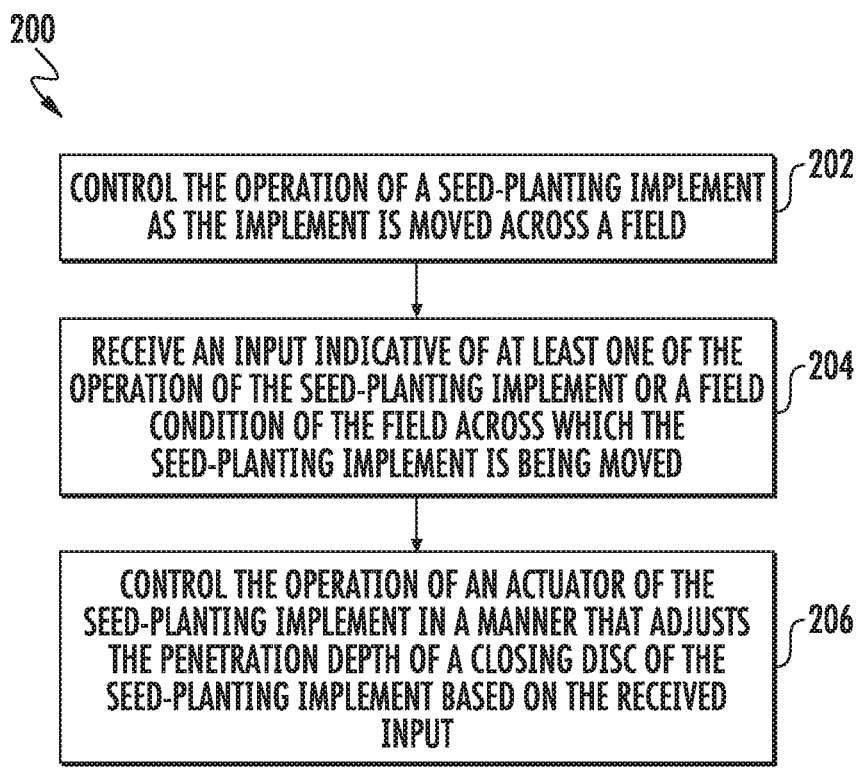
FIG. 5 illustrates a flow diagram of one embodiment of a method for adjusting closing disc penetration depth of a seed-planting implement in accordance with aspects of the present subject matter.

Referring now to FIG. 5, a flow diagram of one embodiment of a method 200 for adjusting closing disc penetration depth of a seed-planting implement is illustrated in accordance with aspects of the present subject matter. In general, the method 200 will be described herein with reference to the implement 10 and the system 100 described above with reference to FIGS. 1-4. However, it should be appreciated by those of ordinary skill in the art that the disclosed method 200 may generally be utilized to adjust the closing disc penetration depth for any seed-planting implement having any suitable implement configuration and/or in connection with any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include controlling, with a computing device, the operation of a seed-planting implement as the seed-planting implement is moved across a field. For instance, as described above, the controller 124 may be configured to control the operation of one or more components of a seed-planting implement 10 as the implement 10 is being moved across a field.

Additionally, at (204), the method 200 may include receiving, with the computing device, an input indicative of at least one of the operation of the seed-planting implement or a field condition of the field across which the seed-planting implement is being moved. For instance, as described above, in one embodiment, the controller 124 may be configured to receive an input from one or more sensors configured to capture data indicative of the operation of the implement 10, such as a down force sensor 110, a depth sensor 112, a load sensor 114, a soil flow sensor 116, and/or a position sensor 120. Furthermore, in another embodiment, the controller 124 may be configured to receive an input from one or more sensors configured to capture data indicative of one or more field conditions of the field across which the implement 10 is being moved, such as a soil moisture sensor 102. Additionally, in a further embodiment, the controller 124 may be configured to receive an input from a user interface 130.

Moreover, as shown in FIG. 5, at (206), the method 200 may include controlling, with the computing device, the operation of an actuator of the seed-planting implement in a manner that adjusts the penetration depth of a closing disc of the seed-planting implement based on the received input. For instance, as described above, the controller 124 may be configured to transmit control signals 134 to an actuator 104 of a furrow closing assembly 44 instructing the actuator 104 to adjust the penetration depth of one or more closing discs 46 of the furrow closing assembly 44 based on the received input.

It is to be understood that the steps of the method 200 are performed by the controller 124 upon loading and executing software code or instructions, which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 124 described herein, such as the method 200, is implemented in software code or instructions, which are tangibly stored on a tangible computer readable medium. The controller 124 loads the software code or instructions via a direct interface with the computer readable medium or via a wired and/or wireless network. Upon loading and executing such software code or instructions by the controller 124, the controller 124 may perform any of the functionality of the controller 124 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for adjusting closing disc penetration depth of a seed-planting implement, the system comprising:
an implement frame;
a furrow opening assembly adjustably coupled to the implement frame, the furrow opening assembly including a gauge wheel and an opener disc;
a furrow closing assembly adjustably coupled to the implement frame, the furrow closing assembly including at least one closing disc configured to penetrate the soil in a manner that closes a furrow formed in the soil by the seed-planting implement;
an actuator configured to adjust a penetration depth of the at least one closing disc; and
a controller configured to:
receive an input indicative of a position of the gauge wheel relative to the implement frame;
determine a depth of the furrow based on the position of the gauge wheel relative to the implement frame, and
control an operation of the actuator in a manner that adjusts the penetration depth of the at least one closing disc based on the determined depth of the furrow.

2. The system of claim 1, further comprising:
a sensor configured to detect a position of the gauge wheel relative to the implement frame, the sensor communicatively coupled to the controller, wherein the controller is configured to receive the input from the sensor.

3. The system of claim 2, wherein the controller is further configured to monitor the determined depth of the furrow relative to a threshold parameter value and adjust the penetration depth of the at least one closing disc when the determined depth of the furrow exceeds or falls below the threshold parameter value.

4. The system of claim 1, wherein the controller is further configured to receive the input from an operator of the seed-planting implement.

5. The system of claim 1, wherein the received input is indicative of an angle defined between a support arm on which the gauge wheel is mounted and the implement frame.

6. A seed-planting, implement, comprising:
- a frame;
- a furrow opening assembly adjustably coupled to the frame, the furrow opening assembly including at least one disc opener configured to form a furrow in the soil;
- a furrow closing assembly adjustably coupled to the frame, the furrow closing assembly including at least one closing disc configured to penetrate the soil in a manner that closes the furrow;
- an actuator configured to adjust a position of the at least one closing disc relative to the frame; and
- a controller configured to:
  - receive an input indicative of a down force exerted on a row unit of the seed-planting implement or soil flow through the furrow closing assembly;
  - monitor a depth of the furrow based on the down force exerted on the row unit of the seed-planting implement or the soil flow through the furrow closing assembly; and
  - control an operation of the actuator in a manner that adjusts a penetration depth of the at least one closing disc based on the monitored depth of the furrow.

7. The seed-planting implement of claim 6, wherein the received input is indicative of the down force exerted on the row unit of the seed-planting implement.

8. A method for adjusting closing disc penetration depth of a seed-planting implement, the method comprising:
- controlling, with a computing device, an operation of the seed-planting implement as the seed-planting implement is moved across a field, the seed-planting implement including an implement frame, a gauge wheel, and a furrow closing assembly having at least one closing disc configured to penetrate the soil in a manner that closes a furrow formed in the soil by the seed-planting implement;
- receiving, with the computing device, an input indicative of position of the gauge wheel relative to the implement frame; and
- determining, with the computing system, a depth of the furrow based on the position of the gauge wheel relative to the implement frame; and
- controlling, with the computing device, an operation of an actuator in a manner that adjusts a penetration depth of the at least one closing disc based on the determined depth of the furrow.

9. The method of claim 8, wherein the receiving the input comprises receiving, with the computing device, the input from a sensor configured to detect a position of the gauge wheel relative to the implement frame.

10. The method of claim 9, further comprising:
- monitoring, with the computing device, the determined depth of the furrow relative to a threshold parameter value and adjust the penetration depth of the at least one closing disc when the determined depth of the furrow exceeds or falls below the threshold parameter value.

11. The method of claim 8, wherein receiving the input comprises receiving, with the computing device, the input from an operator of the seed-planting implement.

12. The seed-planting implement of claim 6, wherein the received input is indicative of the soil flow through the furrow closing assembly.

13. The method of claim 8, wherein receiving the input comprises receiving, with the computing device, an input indicative of an angle defined between a support arm on which the gauge wheel is mounted and the implement frame.

* * * * *